United States Patent
Costa et al.

(10) Patent No.: US 6,915,933 B2
(45) Date of Patent: Jul. 12, 2005

(54) PORTABLE APPARATUS FOR CARRYING A STROLLER

(76) Inventors: Laura A. Costa, 455 Roxton Road, Toronto, Ontario (CA), M6G 3R5; Susana Couto, 82 Larchmount Ave, Toronto, Ont (CA), M4M 2Y7

( * ) Notice: Subject to any disclaimer, the term of this patent is extended or adjusted under 35 U.S.C. 154(b) by 0 days.

(21) Appl. No.: 10/623,334

(22) Filed: Jul. 21, 2003

(65) Prior Publication Data

US 2005/0017039 A1 Jan. 27, 2005

(51) Int. Cl.$^7$ .......................... B65D 85/68; A45C 15/00
(52) U.S. Cl. ...................... 224/576; 206/335; 224/191; 224/656; 280/647
(58) Field of Search ................................ 224/153, 191, 224/201–659; 206/335; 150/154–168; 280/37–38, 647, 641–646

(56) References Cited

U.S. PATENT DOCUMENTS

| | | | | |
|---|---|---|---|---|
| 3,421,774 A | * | 1/1969 | Patterson | 280/642 |
| 3,689,099 A | * | 9/1972 | Patterson | 280/38 |
| 3,963,103 A | | 6/1976 | Cowen, III | |
| 4,089,447 A | * | 5/1978 | Achmeteli | 224/644 |
| 4,466,124 A | * | 8/1984 | Kirkham, Jr. | 383/2 |
| 4,586,721 A | | 5/1986 | Harada et al. | |
| 4,747,526 A | | 5/1988 | Launes | |
| 5,492,254 A | | 2/1996 | Challoner et al. | |
| 5,564,720 A | * | 10/1996 | Stringer | 280/30 |
| 5,573,166 A | * | 11/1996 | Leja | 224/630 |
| 5,662,339 A | | 9/1997 | Svendsen et al. | |
| 5,803,470 A | * | 9/1998 | Smith | 280/37 |
| 5,964,470 A | | 10/1999 | Syendsen et al. | |
| 5,971,409 A | | 10/1999 | Butz | |
| 6,481,606 B2 | * | 11/2002 | Pickett | 224/637 |

* cited by examiner

*Primary Examiner*—Bryon P. Gehman

(57) ABSTRACT

An apparatus, for transporting a stroller, includes a sac for receiving a stroller therethrough. A support device is connected adjacent to the bottom end portion of the sac and selectively a frame of a stroller. The wheels of a stroller are allowed to extending outwardly from the open bottom end portion of the sac so that same can be rolled along the ground rather than carried on a user's back. A plurality of elongate straps allows the apparatus to be removably positioned on a back of a user. The apparatus may further include a plurality of adjustable clips cooperating with the plurality of straps respectively and for allowing a length thereof to be selectively adjusted. The apparatus may further include device for selectively closing the top end portion of the sac and for assisting to stabilize a stroller positioned therein.

20 Claims, 3 Drawing Sheets

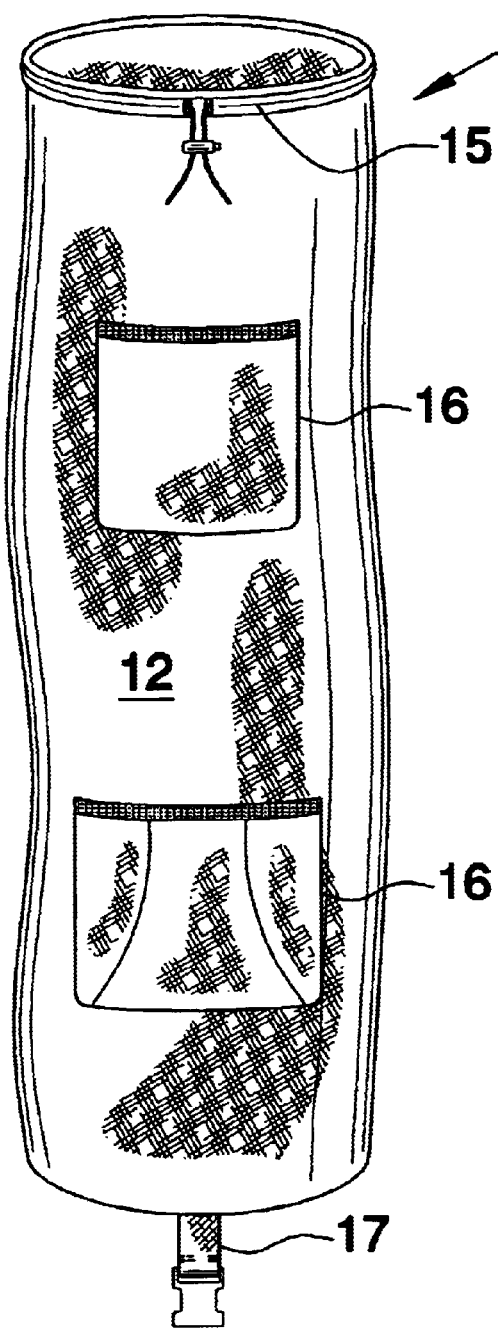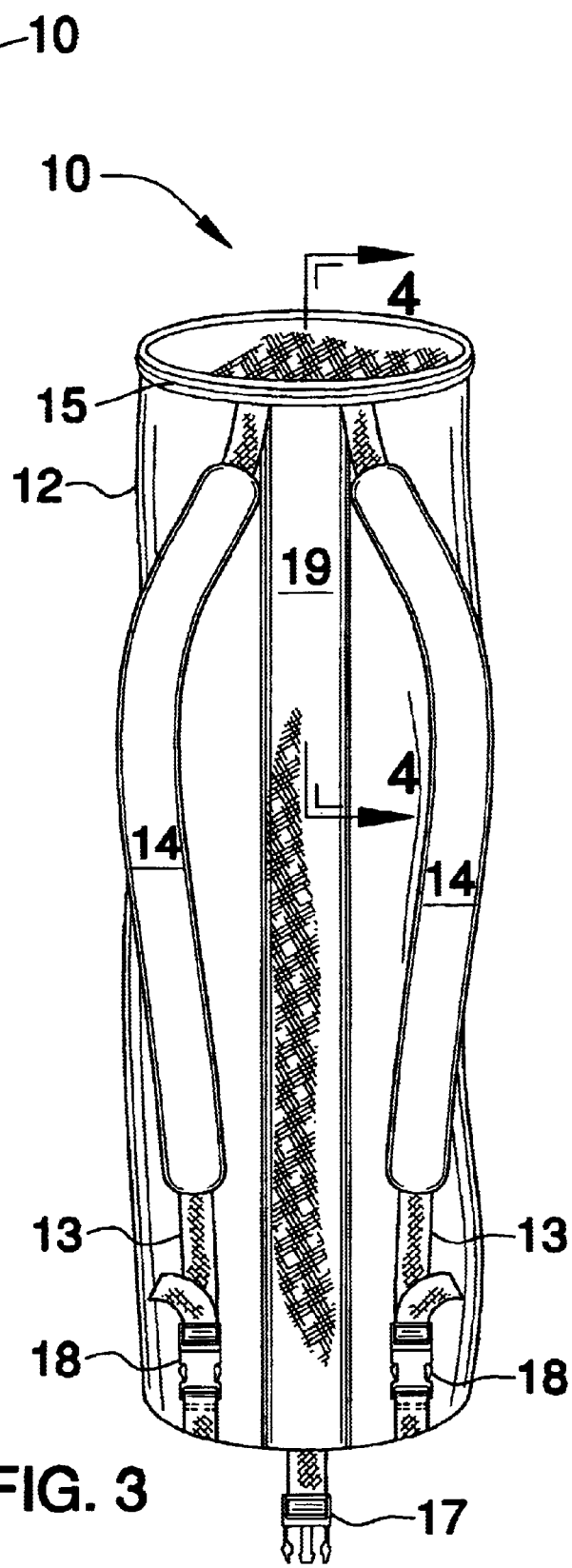
FIG. 2
FIG. 3

PORTABLE APPARATUS FOR CARRYING A STROLLER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a portable carrying apparatus and, more particularly, to a portable sac for carrying a stroller on a user's back and including open top and bottom end portions for allowing the stroller to be rolled while housed within the sac.

2. Prior Art

The use of strollers, backpacks and other child-supporting devices of various design are known in the prior art. More specifically, strollers, backpacks and other child-supporting devices and heretofore utilized for the purpose of supporting and transporting children are known to consist basically of familiar, expected and obvious structural configurations, notwithstanding the myriad of designs encompassed by the crowded prior art which have been developed.

People who travel to vacation destinations often spend a great mount of time touring that vacation destination on foot. For example, if a person travels to an amusement park or a museum, the entire time at such a destination is spent walking from one attraction to another. When people travel on vacation, they often carry a substantial amount of equipment with them. The equipment that is carried typically includes cameras, food, water, rain gear, sun tanning lotions and the like. If people are travelling with children, the amount of materials that must be carried while walking increases dramatically. Items such as diaper bags, strollers, bottles and the like must now be carried. Likewise, if a vacation is taken at the beach, yet additional equipment must be carried. Such equipment includes beach chairs, umbrellas, playpens, towels, blankets and the like.

In prior art, there have been a number of devices to assist people carry a large amount of equipment as they walk. Such prior art devices commonly fall into the categories of backpacks, carry bags or pull carts. The preferred choice of vacationers for carrying equipment while walking is a cart or stroller. In prior art, there are many types of carts and strollers intended for different purposes. Carts and strollers can hold a large amount of equipment and often include a collapsible umbrella for protection from harsh elements.

Yet, a person can pull same with minimum effort. Unfortunately, such strollers often require a person to maintain both hands thereon and thereby do not allow free movement of an operator's hands. Furthermore, at vacation spots such as a beach, for example, a stroller cannot rolled on the sand and, therefore, must be carried. This causes obvious shortcomings.

BRIEF SUMMARY OF THE INVENTION

In view of the foregoing background, it is therefore an object of the present invention to provide an apparatus for allowing a person to easily carry an umbrella-style stroller in a hands-free manner. These and other objects, features, and advantages of the invention are provided by an apparatus for carrying a stroller, which includes a sac having a hollow interior and includes open top and bottom end portions for allowing a stroller to be positioned therethrough and supported within the sac. Such a sac is preferably formed from waterproof material. The apparatus further includes a support device connected adjacent to the bottom end portion and for selectively supporting a stroller in a substantially vertically position within the sac.

A plurality of elongate straps each has opposed end portions connected to the top and bottom end portions of the sac respectively and for allowing same to be removably positioned on a back of a user. The apparatus may further include an elongate pad member connected to the sac and extending from the top end portion to the bottom end portion thereof. The pad member helps provide comfort to a user when the apparatus is carried thereby. The apparatus may further include a plurality of pockets connected to the sac and extending outwardly therefrom. The plurality of pockets each preferably includes an elastic upper end portion for assisting to maintain objects therein respectively.

The apparatus may further include a plurality of adjustable clips cooperating with the plurality of straps respectively and for allowing a length thereof to be selectively adjusted. Advantageously, the apparatus may be adapted to fit different sized users. The apparatus may further include device for selectively closing the top end portion of the sac and for assisting to stabilize a stroller positioned therein. Such a device preferably is a drawstring connected around a perimeter thereof. Furthermore, the supporting device may include a strap and a clip for selectively maintaining a stroller within a cavity of the sac.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a rear elevational view of the apparatus shown in FIG. 1;

FIG. 3 is a front elevational view of the apparatus shown in FIG. 1;

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
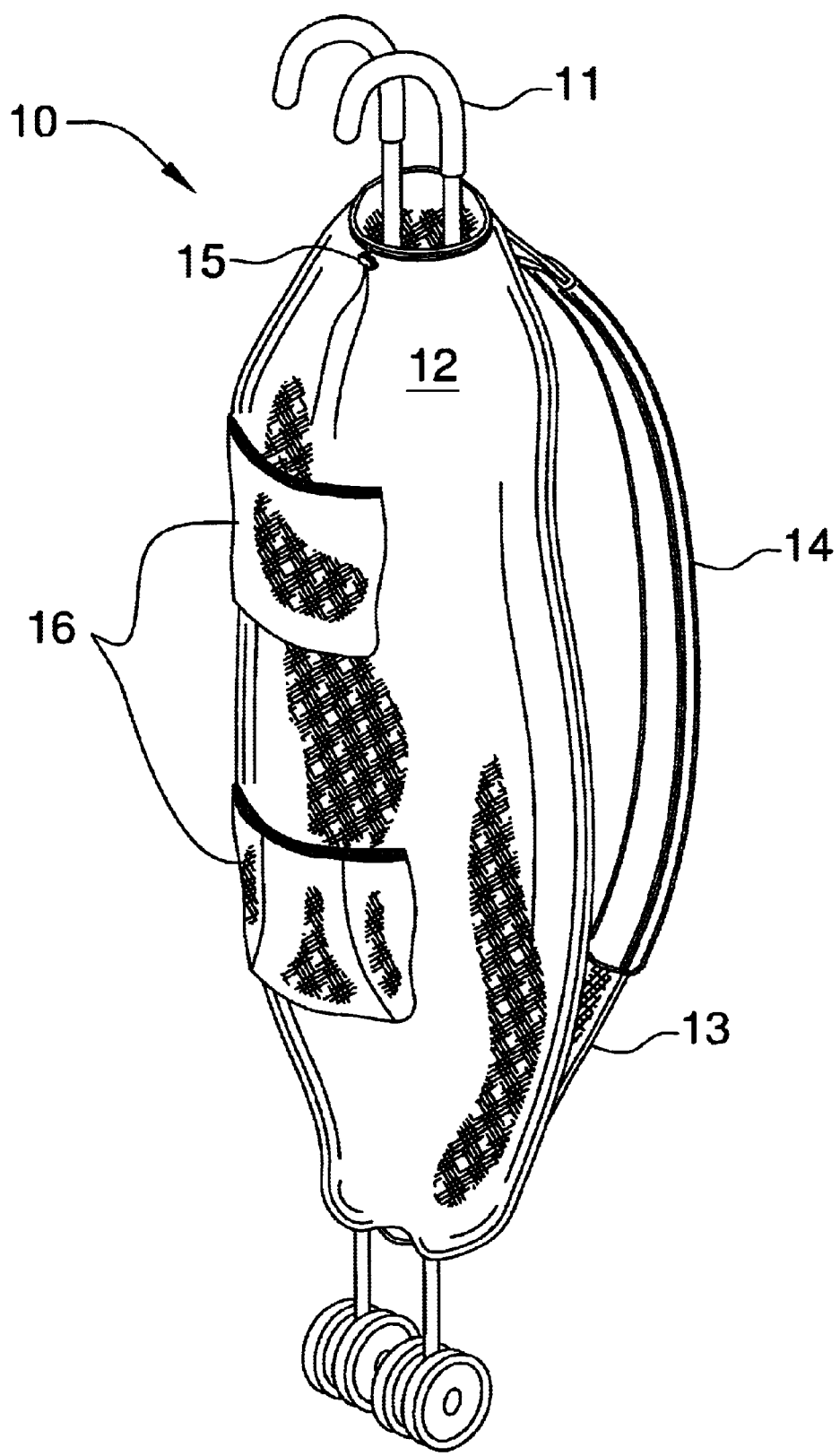
FIG. 1 is a perspective view showing an apparatus for transporting a stroller, in accordance with the present invention.

The apparatus of this invention is referred to generally in FIG. 1 by the reference numeral 10 and is intended to comfortably transport an umbrella-stroller either on a user's back or along the ground. It should be understood that the apparatus 10 may be used to transport many different types of strollers and, therefore, should not be construed as being limited to transporting only umbrella-strollers. The apparatus 10 includes a sac 12 preferably made from flexible, waterproof material such as neoprene material, for example.

Such a sac defines the length of the apparatus 10 and is formed to be sufficiently wide for receiving a conventional stroller 11 therethrough. Accordingly, sac 12 has a hollow interior for receiving stroller 11 and further includes open top and bottom end portions, respectively. Advantageously, wheels of a conventional stroller 11 may extended outwardly from such open end portions so that the stroller 11 can be pulled along while contained within the apparatus 10.

Apparatus 10 further includes a plurality of straps 13 having opposed end portions connected adjacent to the top and bottom end portions of sac 12. Such a plurality of straps 13 preferably include padded members 14 respectively extending along a length thereof for providing comfort and support during use. Apparatus 10 further includes a plurality of pockets 16 connected to the outer surface of sac 12 and disposed between its top and bottom end portions. Such pockets 16 are able to receive objects therein for providing further storage capacity. In addition, pockets 16 may be shaped to accommodate various sized objects therein.

Now referring to FIG. 2, apparatus 10 includes a drawstring 15 connected to the perimeter of the top end portion thereof. Such a drawstring 15 is preferably a conventional drawstring and allows the top end portion of sac 12 to be selectively tightened and loosened to thereby assist in securely maintaining a stroller 11 within sac 12. A support strap or fastening member 17 includes opposed end portions diametrically connected to opposite sides of the bottom end portion of sac 12. In particular, a first end portion is provided with a female clip portion and a second end portion is provided with a male clip portion. Such clip portions are removably engageable with one another to thereby support a stroller 11 within sac 12 and prevent same from falling through the open bottom end portion thereof.

Figure 5:
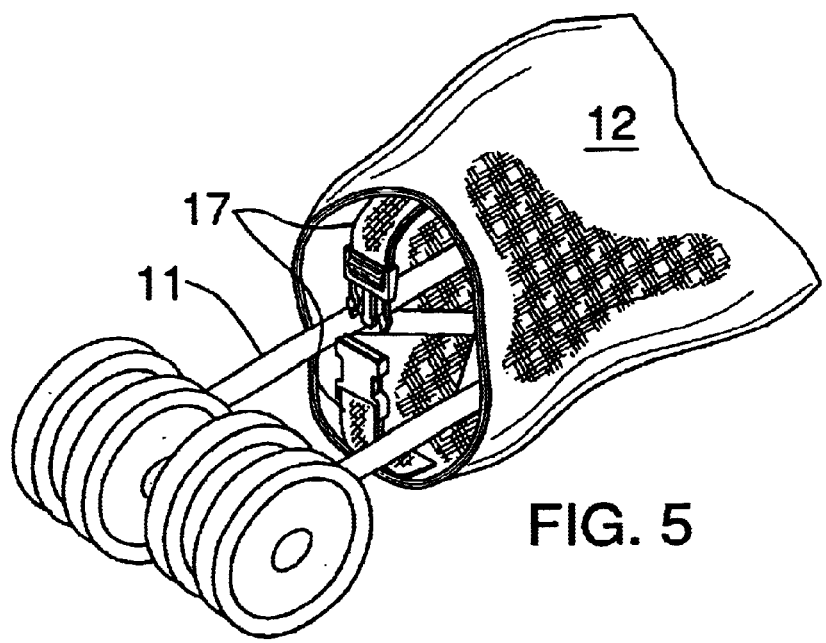
FIG. 5 is a partial perspective view of FIG. 1 showing a selectively lockable support member for supporting a stroller within the apparatus.

As perhaps best shown in FIG. 5, support strap 17 is engageable at the bottom end portion of sac 12 wherein it can be positioned between a support frame of a conventional stroller 11. Thus, when sac 12 is moved to a substantially vertical positioned, a stroller 11 can be maintained at a substantially stable orientation within the cavity of sac 12 with its wheels or handles exposed, for example. Of course, other conventional support clips or fastening members may be employed, as well known to a person of ordinary skill in the art.

Now referring to FIG. 3, apparatus 10 further includes an elongate pad member 19 extending from opposed top and bottom end portions of sac 12 and connected to the outer surface thereof. Apparatus 10 further includes a plurality of clips or fastening members 18 for selectively adjusting the respective lengths of straps 13, as desired by a user. Such fastening members 18 are similar to fastening member 17 and help disengage straps 13 at the lower portions thereof, respectively. Accordingly, fastening members 18 are connected to straps 13 adjacent to the bottom end portion of sac 12.

Figure 4:
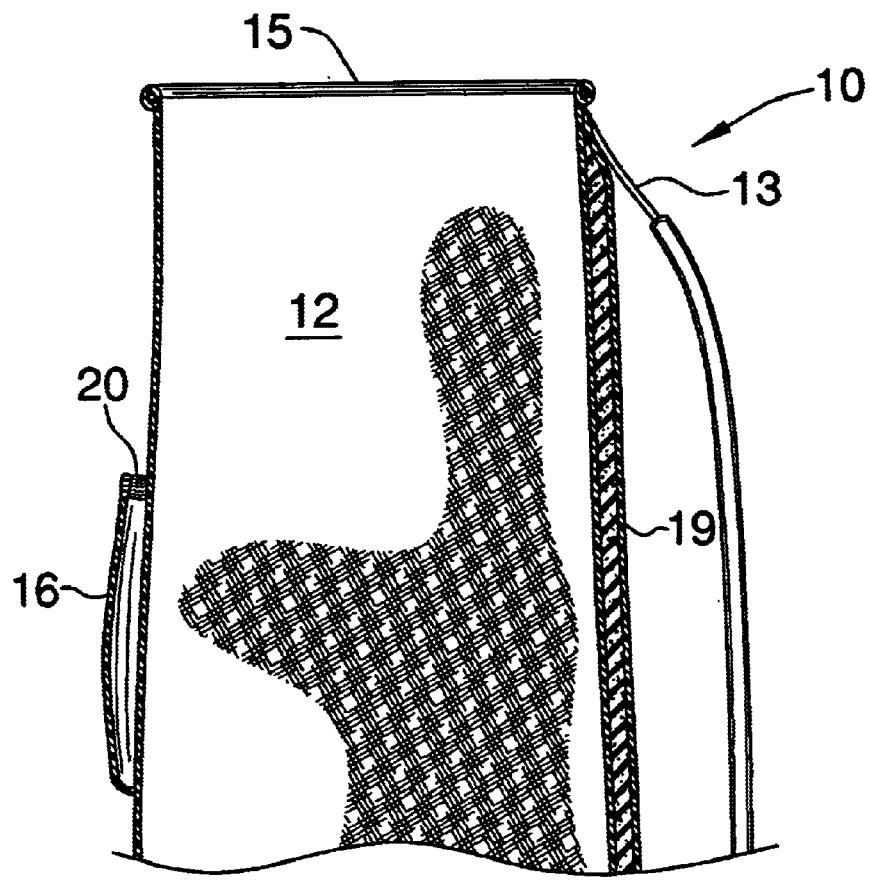
FIG. 4 is an enlarged cross-sectional view taken along line 4—4 in FIG. 3.

Now referring to FIG. 4, pockets 16 extend outwardly from an outer surface of sac 12 and include an elastic upper end portion 20 for assisting to maintain objects therein. In particular, elastic portion 20 has a relaxed positioned which helps to maintain pockets 16 closed and has an extended or stretched position for allowing pockets 16 to be opened in a conventional manner.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for carrying a stroller and comprising:
   a sac having a hollow interior and including an open top end portion and an open bottom and portion allowing a stroller to be positioned therethrough and supported within said sac,
   support means connected adjacent to said bottom end portion and for selectively supporting a stroller in a vertical position within said sac; and
   a plurality of elongate straps having opposed end portions connected to said top and bottom end portions of said sac respectively and for allowing said sac to be removably positioned on a back of a user.

2. The apparatus of claim 1, further comprising an elongate pad member connected to said sac and extending from said top end portion to said bottom end portion thereof, said pad member providing comfort to a user when carrying said apparatus.

3. The apparatus of claim 1, further comprising a plurality of pockets connected to said sac and extending outwardly therefrom, said plurality of pockets each including an elastic upper end portion for assisting to maintain objects therein.

4. The apparatus of claim 1, further comprising a plurality of adjustable clips cooperating with said plurality of straps respectively and for allowing a length thereof to be selectively adjusted.

5. The apparatus of claim 1, further comprising means for selectively closing said top end portion of said sac and for assisting to stabilize a stroller positioned therein.

6. The apparatus of claim 5, wherein said means for selectively closing said top end portion of said sac comprises a drawstring connected around a perimeter thereof.

7. The apparatus of claim 1, wherein said support means comprises a strap and a clip for selectively maintaining a stroller within a cavity of said sac.

8. The apparatus of claim 1, wherein said support means comprises a flexible strap and a clip for selectively maintaining a stroller within a cavity of said sac.

9. The apparatus of claim 1, wherein said sac is formed from waterproof material.

10. The apparatus of claim 1, wherein said sac is formed from flexible, waterproof material.

11. An apparatus for carrying a stroller on a back of a user and comprising:
   a sac formed from flexible material and having a hollow interior, said sac including an open top end portion and an open bottom end portion for allowing a stroller to be positioned therethrough and support within said sac,
   support means connected adjacent to said bottom end portion and for selectively supporting a stroller in a vertical position within said sac;

a plurality of elongate straps having opposed end portions connected to said top and bottom end portions of said sac respectively and for allowing said sac to be removably positioned on a back of a user; and an elongate pad member connected to said sac and extending from said top end portion to said bottom end portion thereof, said pad member providing comfort to a user when carrying said apparatus.

12. The apparatus of claim 11, further comprising a plurality of pockets connected to said sac and extending outwardly therefrom, said plurality of pockets each including an elastic upper end portion for assisting to maintain objects therein.

13. The apparatus of claim 11, further comprising a plurality of adjustable clips cooperating with said plurality of straps respectively and for allowing a length thereof to be selectively adjusted.

14. The apparatus of claim 11, further comprising means for selectively closing said top end portion of said sac and for assisting to stabilize a stroller positioned therein.

15. The apparatus of claim 14, wherein said means for selectively closing said top end portion of said sac comprises a drawstring connected around a perimeter thereof.

16. An portable apparatus for carrying a stroller on a back of a user and comprising:

a sac formed from flexible material and having a hollow interior, said sac including an open top end portion and an open bottom end portion for allowing a stroller to be positioned therethrough and supported within said sac;

support means connected adjacent to said bottom end portion and for selectively supporting a stroller in a vertical position within said sac;

a plurality of elongate straps having opposed end portions connected to said top and bottom end portions of said sac respectively and for allowing said sac to be removably positioned on a back of a user;

an elongate pad member connected to said sac and extending from said top end portion to said bottom end portion thereof, said pad member providing comfort to a user when carrying said apparatus; and a plurality of pockets connected to said sac and extending outwardly therefrom, said plurality of pockets each including an elastic upper end portion for assisting to maintain objects therein.

17. The apparatus of claim 16, further comprising a plurality of adjustable clips cooperating with said plurality of straps respectively and for allowing a length thereof to be selectively adjusted.

18. The apparatus of claim 16, further comprising means for selectively closing said top end portion of said sac and for assisting to stabilize a stroller positioned therein.

19. The apparatus at claim 18, wherein said means for selectively closing said top end portion of said sac comprises a drawstring connected around a perimeter thereof.

20. The apparatus of claim 16, wherein said support means comprises a strap and a clip for selectively maintaining a stroller within a cavity of said sac, said clip comprising: removably interlockable male and female portions.

* * * * *